(12) United States Patent
Lee

(10) Patent No.: US 11,706,503 B2
(45) Date of Patent: Jul. 18, 2023

(54) METHOD AND PROGRAM FOR PRODUCING AND PROVIDING REACTIVE VIDEO

(71) Applicant: Momenti, Inc., New York, NY (US)

(72) Inventor: Chul Woo Lee, Seoul (KR)

(73) Assignee: Momenti, Inc., New York City, NY (US)

( * ) Notice: Subject to any disclaimer, the term of this patent is extended or adjusted under 35 U.S.C. 154(b) by 0 days.

(21) Appl. No.: 17/508,664

(22) Filed: Oct. 22, 2021

(65) Prior Publication Data

US 2022/0132225 A1 Apr. 28, 2022

Related U.S. Application Data

(60) Provisional application No. 63/104,984, filed on Oct. 23, 2020.

(51) Int. Cl.
| | |
|---|---|
| *H04N 21/854* | (2011.01) |
| *H04N 21/8545* | (2011.01) |
| *G06F 16/783* | (2019.01) |
| *H04N 21/81* | (2011.01) |
| *G06V 20/40* | (2022.01) |

(52) U.S. Cl.
CPC ....... *H04N 21/8545* (2013.01); *G06F 16/783* (2019.01); *G06V 20/46* (2022.01); *H04N 21/816* (2013.01)

(58) Field of Classification Search
None
See application file for complete search history.

(56) References Cited

U.S. PATENT DOCUMENTS

2021/0390937 A1\* 12/2021 Elgammal ................ G06N 3/08

\* cited by examiner

*Primary Examiner* — Omar S Parra
(74) *Attorney, Agent, or Firm* — Studebaker & Brackett PC

(57) ABSTRACT

The inventive concept relates to a method for producing a multi-reactive video and providing a multi-reactive video service, and a program using the same. It is possible to grasp a user's reaction to a video by recording manipulation details for a specific user's multi-reactive video. For example, it is possible to grasp the object of interest and the degree of interest of a user and to grasp a user interest in the user, by grasping the number of touch manipulations to the user's multi-reactive video, a frame in which a touch manipulation has been performed, and an object in the frame, or the like.

13 Claims, 10 Drawing Sheets

(a)

(b)

100

METHOD AND PROGRAM FOR PRODUCING AND PROVIDING REACTIVE VIDEO

CROSS-REFERENCE TO RELATED APPLICATIONS

This application claims priority based on provisional application No. 63/104,984, filed on Oct. 23, 2020, the contents of which is incorporated by reference in their entireties.

BACKGROUND

Embodiments of the inventive concept described herein relate to a multi-reactive video production and service providing method and a program using the same, and more particularly, relate to a multi-reactive video production and service providing method and a program using the same.

Recently, a technology for capturing an image has been developed dramatically. Not only camcorders and digital cameras, but also mobile terminals such as smart phones may also capture high resolution images. Furthermore, a 360-degree camera, a 3D image camera and the like are emerging.

The image is captured by an image capturing device and stored in a specific format, and played by a playable terminal Image playback is provided unilaterally in chronological order without interaction with viewers. In other words, the viewers may sense only the visual feeling through playing images.

SUMMARY

Embodiments of the inventive concept provide a multi-reactive video producing method that performs various condition playbacks depending on a user's manipulation, based on a video database (e.g., a basic video) in which a general video or a plurality of image frames are stored.

Embodiments of the inventive concept provide a method for providing an output video responsive to a plurality of input manipulations based on a plurality of basic videos and generating a multi-reactive video while the capacity of the output video is reduced through compression.

Embodiments of the inventive concept provide a method of generating and using a multi-reactive video that is capable of generating various output images through separate manipulation or simultaneous manipulation together with a plurality of input manipulations.

Embodiments of the inventive concept provide a method and program for implementing a multi-reactive video generation file that provides a multi-reactive video generation file for implementing multi-reactive video to which various functions are applied by applying specific conditions to a general video or a 2D or 3D video database.

Embodiments of the inventive concept provide a multi-reactive video-based user interest analyzing method that calculates a user's interest in an object in an image in response to the obtained multi-reactive video manipulation of a user.

Embodiments of the inventive concept provide a multi-reactive video generating method that generates a multi-reactive data structure that allows a user to adjust a direction or sequence of an output video by adding an event axis within a video (e.g., adding controlling a video in units of events) to overcome the limitation of content that has previously limited to playing a video in chronological order.

Problems to be solved by the inventive concept are not limited to the problems mentioned above, and other problems not mentioned will be clearly understood by those skilled in the art from the following description.

According to an embodiment, a reactive video-based service providing method performed by a device includes, when at least one basic video is received from a first user terminal, generating a compressed video, which is implemented depending on a manipulation of a second user and which includes only a movement of an object, based on the at least one basic video, the at least one basic video being an original video, which is reactively implemented depending on a manipulation of a user and which includes the movement of the object, generating a multi-reactive video generation condition by using a plurality of manipulation inputs corresponding to reactions capable of being generated in the compressed video, generating and uploading a multi-reactive video by applying the multi-reactive video generation condition to the compressed video, and, when manipulation input information is received as the second user enters a manipulation for the multi-reactive video, playing a video by applying the manipulation input information to the multi-reactive video. The compressed video is data of a stack structure including information about a combination of images generated by dividing or correcting the at least one basic video. The multi-reactive video generation condition includes data including information to be implemented reactively in combination with a specific region of the compressed video. The manipulation input information includes data including information about a user manipulation based on the multi-reactive video.

According to an embodiment, a reactive-video-based service providing device includes a communication module, a storage module that stores at least one process required to provide a multi-reactive-video-based service, and a control module configured to control an operation for providing the multi-reactive-video-based service based on the at least one process. The control module is configured to, when at least one basic video is received from a first user terminal, generate a compressed video, which is implemented depending on a manipulation of a second user and which includes only a movement of an object, based on the at least one basic video, the at least one basic video being an original video, which is reactively implemented depending on a manipulation of a user and which includes the movement of the object, to generate a multi-reactive video generation condition by using a plurality of manipulation inputs corresponding to reactions capable of being generated in the compressed video, to generate and upload a multi-reactive video by applying the multi-reactive video generation condition to the compressed video, and, when manipulation input information is received as the second user enters a manipulation for the multi-reactive video, to play a video by applying the manipulation input information to the multi-reactive video. The compressed video is data of a stack structure including information about a combination of images generated by dividing or correcting the at least one basic video. The multi-reactive video generation condition includes data including information to be implemented reactively in combination with a specific region of the compressed video. The manipulation input information includes data including information about a user manipulation based on the multi-reactive video.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
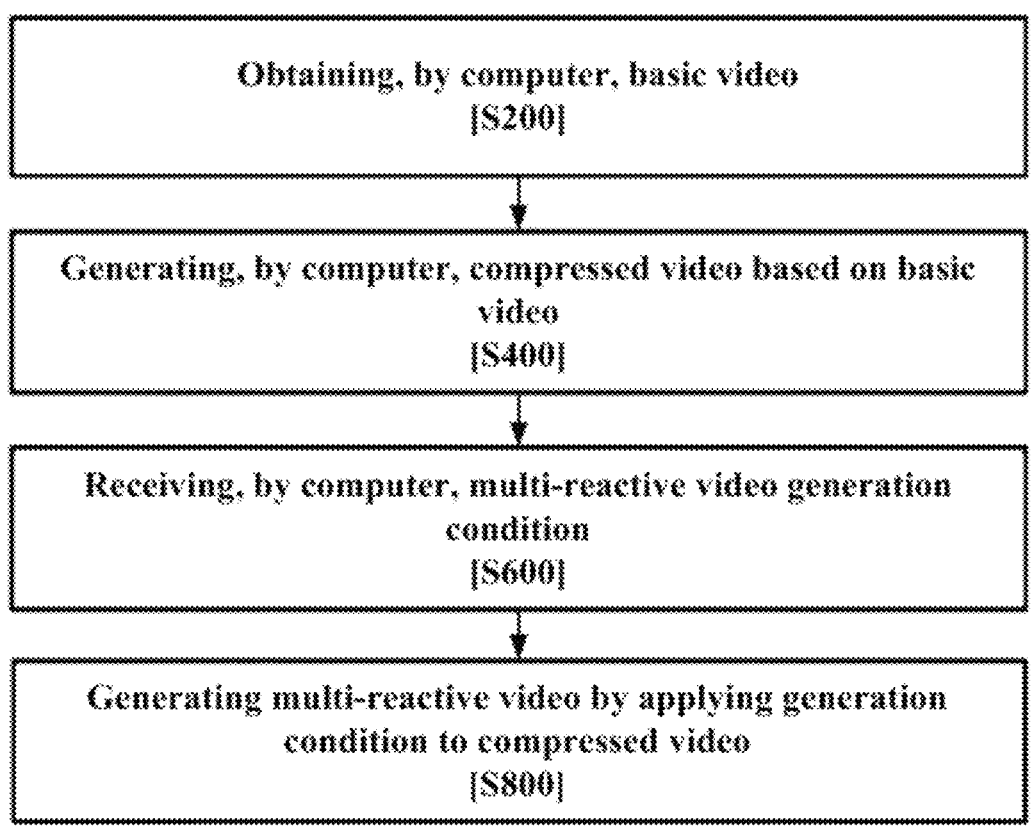
FIG. 1 is a flowchart of a method for generating a multi-reactive video, according to an embodiment of the inventive concept.

Hereinafter, preferred embodiments of the inventive concept will be described in detail with reference to the accompanying drawings. The above and other aspects, features and advantages of the inventive concept will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein do not exclude the presence or addition of one or more other components, in addition to the aforementioned components.

In this specification, a 'multi-reactive video' refers to a video that is changed or played in response to a specific input manipulation of a user (i.e., a viewer) who watches a video. For example, the 'multi-reactive video' may mean a video played as if an object in the video is moving in response to a user's manipulation as the user's input manipulation corresponding to the specific movement of an original video is connected.

In this specification, a 'computer' includes all the various devices capable of performing arithmetic processing. For example, the computer may correspond to not only a desktop personal computer (PC) or a notebook but also a smart phone, a tablet PC, a cellular phone, a personal communication service (PCS) phone, a mobile terminal of a synchronous/asynchronous International Mobile Telecommunication-2000 (IMT-2000), a palm PC, a personal digital assistant (PDA), and the like. Furthermore, the computer may correspond to a server computer that receives information from a client. Hereinafter, in this specification, the computer may be represented as a terminal.

In this specification, an 'input manipulation' refers to a manipulation to an image of the user received through an input means of the computer playing a multi-reactive video. For example, the input manipulation may include manipulation (e.g., click manipulation, drag manipulation, contact touch manipulation, force touch manipulation (i.e., click manipulation, drag manipulation, contact touch manipulation during a specific time or more, force touch manipulation (i.e., a touch manipulation that applies a specific pressure to a touch screen or touch pad) or the like) that may be entered into a specific point or region in an image, via an input means such as a mouse or touch screen. Moreover, for example, the input manipulation may include the arrangement state or movement of a terminal itself, which may be obtained by using a sensor (e.g., an acceleration sensor, a gyro sensor, or the like) provided in a computer (or a terminal).

In this specification, an 'object' means an object to be manipulated by the user. For example, for an image from capturing an operation in which the user's hand touches a specific object, the object refers to an object touched by the user. Furthermore, for a video indicating that a movement of a specific person is captured, the object may be a person in the video.

In this specification, the 'manipulation object' means a subject manipulates an object in a video. For example, when touching or pressing a bag or pillow in a video by using a hand, the manipulation object means the hand touching the bag or pillow.

In this specification, a 'basic video' means a video that is not implemented reactively. That is, the basic video corresponds to a video generated in a general capture method or a combination of a plurality of image frames, in which image frames are stored for each object location in space.

In this specification, a 'compressed video' refers to a video compressed in a minimum movement unit to implement the basic video as a reactive video. For example, when the same movement is repeatedly included in the basic video, the compressed video is obtained by storing a video corresponding to only one movement after repeated movements are deleted. Besides, for example, when the basic video includes both a movement from a first location to a second location and a movement from the second location to the first location, the basic video having the movement from the first location to the second location may be stored in the compressed video, and the movement from the second location to the first location may be implemented through playing the basic video in reverse.

In this specification, a 'multi-reactive video generation file' is generated by compressing a plurality of basic videos; and the 'multi-reactive video generation file' is a video file for playing a plurality of operations depending on a user's manipulation, or is metadata capable of being implemented as a multi-reactive video as the multi-reactive video generation file is played together with one or more basic videos.

Hereinafter, a multi-reactive video generating method according to an embodiment of the inventive concept will be described with reference to drawings.

FIG. 1 is a flowchart of a method for generating a multi-reactive video, according to an embodiment of the inventive concept.

A computer obtains a basic video (S200). The basic video is an original video including the movement of an object to be reactively implemented depending on a user's manipulation.

The computer may load a basic video, which is already generated and stored, or may generate the basic video (i.e., the computer launches a program or application including a multi-reactive video generation function, and then activates a camera function through the corresponding program or application to capture a basic video immediately) by obtaining image frames in real time.

A reactive video creator (e.g., a content provider or individual user) captures a video including an operation to be implemented reactively.

In the detailed embodiment, the computer may obtain a video for a plurality of movements of the same object from a user and then may generate a multi-reactive video. For example, when an object is the user's hand, the computer obtains a plurality of images indicating that the user's index finger moves or bends in various directions while the user spreads out his/her index finger.

Figure 2:
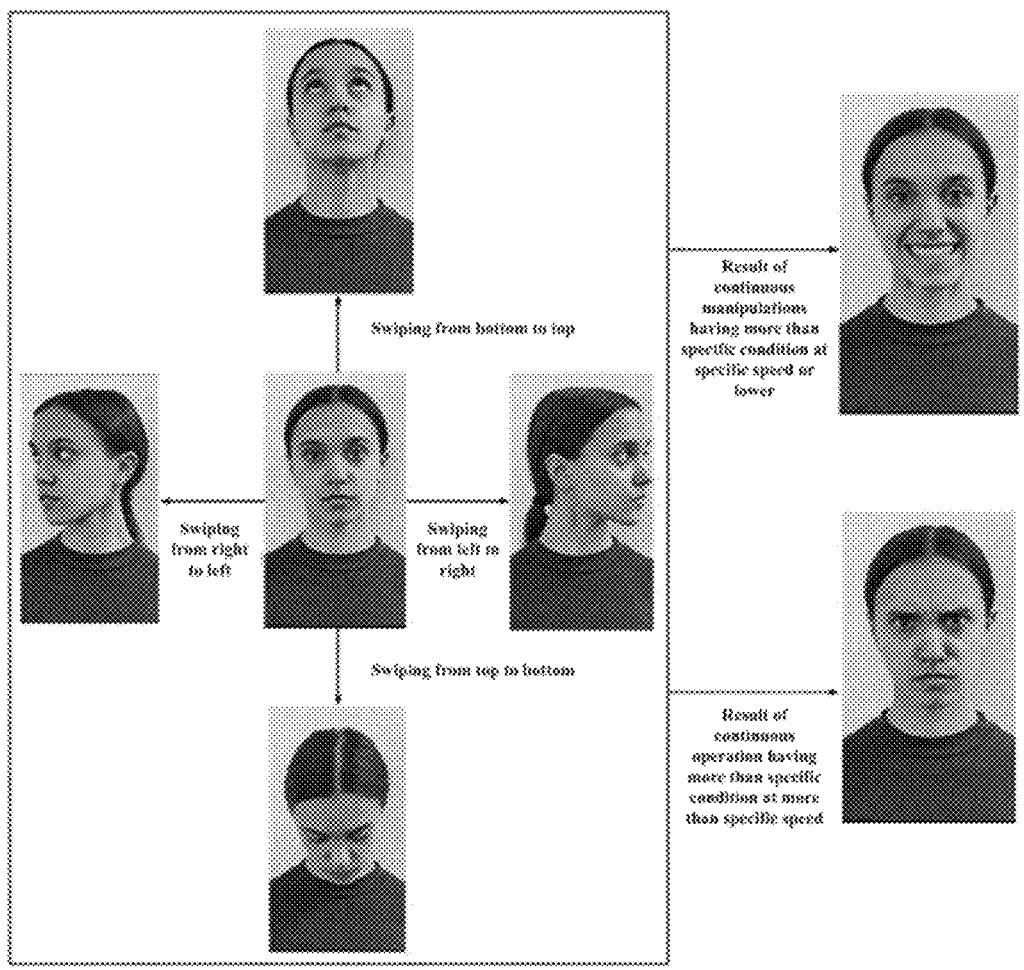
FIG. 2 is an exemplary view for providing a change in a head direction and facial expression of a face that is an object depending on a user's manipulation, according to an embodiment of the inventive concept.

Also, for example, as illustrated in FIG. 2, when the user desires to produce a reactive video indicating that the user's head is rotated vertically or horizontally or the user's facial expression is changed in response to a specific manipulation, the user captures a video including all of the desired head movement and facial expressions.

In addition, when a reactive video indicating that a water balloon bursts or pops up from a floor is generated depending on the manipulation entered by the user, the user sequentially captures a first video indicating that a water balloon is dropped and then bursts, and the second image indicating that a water balloon having a color and size the same as the burst water balloon bounces without bursting.

Figure 3:
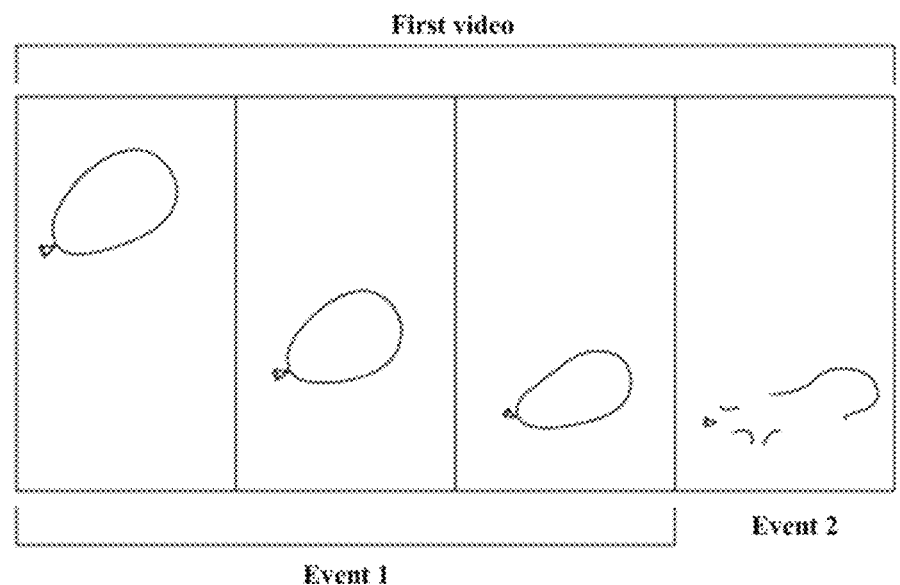
FIG. 3 is an exemplary diagram of a basic video including a plurality of events such that different results are capable of being implemented in response to manipulation entered by a user, according to an embodiment of the inventive concept.

Moreover, the computer obtains one basic video indicating that different events occur after a specific movement is performed, not repeating the existing movement. That is, the computer obtains a video indicating that a plurality of events of an object occur, as a basic video. For example, as illustrated in FIG. 3, the computer obtains a basic video including an event (a first event) of the movement indicating that a water balloon moves downward and an event (a second event) indicating that a water balloon collides with a floor and then bursts. Also, for example, the computer obtains, as the basic video, a video including an event (a first event) indicating that a branch is bent and an event (a second event) indicating that a branch is broken. In addition, the computer obtains a video including an event (a first event) indicating that an air-filled balloon is dented as the balloon is pressed and an event (a second event) indicating that the balloon bursts as the balloon is pressed, as the basic video.

Figure 4:
FIG. 4 is an exemplary diagram of a basic video for implementing an object location change according to each touch manipulation location of a user, according to an embodiment of the inventive concept.

Furthermore, as illustrated in FIG. 4, when the user desires to implement a reactive video for implementing an operation of lifting pasta in a bowl in a plurality of directions at a plurality of heights, the computer captures a video indicating that the user repeatedly lifts the pasta or moves the pasta in a bowl to a plurality of locations in the 3D space.

In addition, the computer may obtain a video indicating that an object is deformed by using a manipulation object, and then may store the video obtained by deleting the manipulation object, as a basic video.

The computer generates a compressed video based on the basic video (S400; a compressed video generating step). The compressed video includes only the movement of an object to be implemented reactively depending on the user's manipulation.

Hereinafter, the detailed description of a method of generating a compressed video will be described.

In an embodiment, the computer deletes an unnecessary video section in a process of implementing a reactive video in the basic video. For example, when the user captures a plurality of movements of an object to implement a multi-reactive video, the basic video may include image frames that will not be implemented reactively between first movement acquisition and second movement acquisition. The computer may separate and delete a video section that is not to be implemented reactively.

For example, the computer may recognize the entire frames included in the basic video, may automatically separate frames having a large similarity difference of an object movement, which are to be deleted, and may delete the frames having the large similarity difference. In addition, for example, the computer may automatically divide the basic video into a plurality of sections. Afterward, the user may select a video section that is not implemented reactively, and then the computer may delete the selected video section. As a specific example, the computer may separate the video section in the basic video in an object movement unit (e.g., a head movement to the right, a head movement to the left, or the like) and then may delete a video section between a plurality of object movement units.

Furthermore, in another embodiment, when a plurality of movement videos included in the basic video includes a redundant video, the computer may delete redundant sections. For example, when fingers within a first basic video, a second basic video, and a third basic video move in different directions in a state where the fingers are positioned at the same finger location, the computer stores only one image frame positioned at the same location. Afterward, when the same movement is maintained in the first basic video and the second basic video, and a plurality of movements are performed in the third basic video, the computer stores only one frame at the corresponding time point of the first basic video and the second basic video, and separately stores the frame for the third basic video.

Also, for example, for the first basic video and the second basic video, in which different results are implemented after the same movement of an object is generated (e.g., when results are different depending on a speed difference after a fall, in a plurality of images indicating that a balloon is dropped to a floor), the computer may store only one section in which the object moves on the same path, and, the computer may store only the sections corresponding to the reaction results of the first basic video and the second basic video, as a result. To this end, the computer may compare the first basic video and the second basic video, may separate sections having the same object movement, may store only one redundant section, and may store a redundant video section, a first result video, and a second result video separately.

Furthermore, for example, when an object repeatedly moves in the same section within the entire basic video (e.g., when a head turns to the left and right), a first section video indicating that the head returns to the front after the head faces the left in a state where the head is facing the front, and a second section video indicating that the head returns to the front after the head faces the right in a state where the head is facing the front are repeated. Accordingly, the computer removes a portion overlapping the first section video and a portion overlapping the second section video.

Moreover, for example, when the head moves from the first location to the second location and then returns to the first location, the computer may store only the first section video indicating the head moves from the first location to the second location and may delete and compress the second section video indicating that the head returns from the second location to the first location. Because the second section video may be implemented by playing the first section video in reverse, the computer deletes the second section video and stores only the first section video in the compressed video. For example, when a person who is an object in the basic video looks at the front, turns his/her head to the left, and then returns to the front, the computer may store only the first section video indicating that the person faces the left at the front. To this end, the computer searches for a portion in the basic video where the object repeatedly moves on the same path, divides a video based on a frame (e.g., a frame in which a change from a movement in a first direction to a movement in a second direction is started) where a movement direction starts to be changed, and stores only the first section video.

Also, the computer may perform a specific movement and then may generate a compressed video obtained by dividing one basic video (e.g., a video indicating that a water balloon is dropped in the air and then is exploded) indicating that different events occur, not repeating a section of the existing movement, into a plurality of events and storing the divided results.

In detail, when the basic video includes a first event section and a second event section, which have appearance changes of the object different from each other before and after a specific reference time point, the compressed video generating step sets a first playback type, in which the first event section is played in the forward direction and then the second event section is continuously played, and a second playback type, in which the first event section is played in the forward direction and then is played in a reverse direction. In the multi-reactive video generation condition receiving step to be described later, the first playback type and the second playback type may be connected by dividing the same user manipulation type into a first manipulation and a second manipulation based on specific reference manipulation intensity, a reference movement length (i.e., a length of swiping manipulation on a touch display), a reference manipulation speed, or a reference manipulation time length (i.e., a time length during which a touch manipulation is continuously applied to a specific location).

Hereinafter, a method in which a computer generates a compressed video for implementing a reactive video by using one basic video including a plurality of events will be described in detail.

When a reactive video indicating that a water balloon bursts or pops up from a floor depending on the manipulation entered by the user is generated, the computer may capture only the first video indicating that a user drops the water balloon and then the water balloon pops up, may divide a first video corresponding to one event into a first event section and a second event section, and may generate a first playback that play only the first event section in the forward direction and then performs reverse playback and a second playback that plays the first event section in the forward direction and then plays the first event section. The computer may connect the first playback and the second playback to different user manipulations, respectively such that the first playback and the second playback may be performed in response to a user manipulation entered by the user.

For example, as illustrated in FIG. 3, when a video indicating that a water balloon is dropped and then bursts is used as a basic video, the computer obtains a reference time point before the water balloon is dropped and bursts, and separates the first event section and the second event section based on the reference time point. The computer may receive the reference time point from a user who generates a reactive video or may automatically calculate the reference time point through a deep learning-trained learning model. For example, the computer may automatically recognize the reference time point through a learning model for searching for a time point at which the appearance of an object is deformed by a reference value or more. As such, the computer may implement the first playback that plays the first event section in the reverse direction after playing, in the forward direction, the first event section where a water balloon falls depending on a first user manipulation (e.g., a weak swiping manipulation that moves an object, which is a water balloon, at a specific reference speed or less), and the second playback that plays, in the forward direction, the first event section where the water balloon falls depending on a second user manipulation (e.g., a strong swiping manipulation that moves an object, which is a water balloon, at more than a specific reference speed) and then plays the second event section continuously.

Moreover, even when an object is dropped at a specific reference speed or less, the computer may classify different events depending on a speed corresponding to the user's swiping manipulation. For example, as described below, after a user manipulation is connected in a movement direction of the water balloon, the computer may set a start point of reverse playback of the first event section depending on the intensity of a touch manipulation. Because a difference in the degree of deformation of the balloon after the balloon touches the floor is present depending on a speed at which the balloon falls, the computer may start reverse playback after playing the video until a time point at which a division criterion associated with the second event is long from the reference time point as the strength of user manipulation decreases.

Also, as another example, when a video indicating that a branch is pulled and bent and then is broken is used as a basic video, the computer sets a time point, at which the branch is broken, as the reference time point, and then divides the video into a first event section and a second event section. The reference time point may be set by being entered by a user creating a reactive video; alternatively, the reference time point may also be set by automatically calculating a time point at which a change (i.e., a change in which a branch is broken) in an object appearance occurs by the reference value or more. In addition, as a forward playback and a reverse playback are performed on the first event, the central location in a movement of the first event section is set to correspond to a start time point of the compressed video to generate a video indicating that a branch is realistically shaken at a location higher than a location where the movement is started. The start time point may be set by the user generating a reactive video. The computer may calculate a path on which an object moves in the basic video, and then may also set a frame, which corresponds to a central location of the path, as the start time point. Besides, after the forward playback is performed from the start time point depending on a level (e.g., a length of a swiping manipulation entered on a touch display) of a user manipulation entered by the user within a first event section, a time point at which the reverse playback is started may be set differently.

As such, the computer may generate a compressed video capable of implementing a reactive video for generating various reactions depending on a user manipulation, by using one basic video. The computer may implement the first playback type that plays the first event section in the forward direction from a start time point and then continuously plays the second event section after a reference time point. Furthermore, a computer may implement the second playback type that performs the forward playback from a start time point in the first event section to a first specific stop time point, performs the reverse playback up to the start time point, performs reverse playback from the start time point to the second stop time point in a direction of the initial time point of the basic video, and proceeds to forward playback again to the start time point. As the computer repeats a playback that allows the first stop time point and the second stop time point gradually to approach the start time point during the second playback, the computer may implement a realistic reactive video indicating that a branch vibrates and then the vibration of the branch is stopped while the amplitude of the vibration is reduced.

The second stop time point is set to correspond to a first stop time point. For example, the time point of the image frame, at which an object falls from the start location in a direction of the initial location in an initial video by the same value as a difference between an object location (hereinafter, a start location) on a frame at a start time point and an object location at a first stop time point or by a value reduced depending on a specific ratio, is set as a second stop time point.

Also, the computer may divide a detailed playback type (e.g., a (2-1)-st playback type, a (2-2)-nd playback type, or the like) depending on a location at the first stop time point in the second playback type. In other words, an extent to which an object vibrates after being changed in a forward direction from the reference location of the object may be divided into sub-types.

As described below, the computer may connect different user manipulations to the first playback type and the second playback type. For example, when the computer connects a user manipulation of swiping an object, the computer may connect the first playback type to a swiping manipulation having more than a specific standard speed or more than a specific standard length and may connect the swiping manipulation having the specific reference speed or less or a reference length or less to the second playback type, depending on the user's request. Moreover, the computer may divide the reference speed or reference length and then may sequentially connect the divided results to subtypes of the second playback type.

Also, as another example, the computer sets a time point just before a balloon bursts as the reference time point by using a video, which indicates that the balloon bursts after the deformation that an air-filled balloon is dented as the balloon is pressed, as a basic video. The computer sets a section before the reference time point to a first event section, and sets a section after the reference time point to a second event section. As such, the computer sets the first playback type that plays a second event section continuously after the first event section is played, and the second playback type that plays the first section in forward and reverse directions. As described below, the computer connects the first playback type to a user manipulation having more than specific force touch intensity or more than a time length, at which a touch manipulation is entered, and connects the second playback type to a user manipulation having the specific force touch intensity or less or the time length or less that the touch manipulation is entered.

To generate a reactive video, a method of generating a basic video as a compressed video is not limited thereto, and various methods may be applied.

The computer performs a process for extracting the image frame or video section on a plurality of basic videos. In this way, the computer may minimize an image frame required in a process of producing a multi-reactive video by using a plurality of basic videos indicating that one object is moved.

Also, the computer divides a region within each frame for a plurality of frames included in a plurality of basic videos such that regions redundantly stored in a plurality of image frames are not stored redundantly.

For example, when generating a multi-reactive video by using a plurality of basic videos (e.g., a first basic video, a second basic video, and a third basic video) indicating that an index finger is moved differently, the computer extracts a background region excluding a finger, which is an object. Because the background region is a common portion in a plurality of videos for the movement of an index finger, the computer sets the extracted background region as a common region. At this time, the computer may extract and collect only a region, which is maintained as a background while a finger being an object does not appear in a plurality of basic videos, so as to be extracted as a background region. As another example, the computer generates a background image, in which a portion where the finger is positioned is filled, based on background information, which appears while an object is moved, and a surrounding video of a background. In this way, the computer may reduce a capacity for storing a portion included in every frame as a background.

Also, the computer reduces a data capacity by dividing and storing an object region (e.g., the user's hand) in a plurality of basic videos. For example, when only fingers are moved and a back of a hand is maintained at the same location in the first basic video and the second basic video, the computer separates the back of the hand and stores only one video corresponding to the back of a hand for specific one or more frames of the first basic video and the second basic video, or may store only videos corresponding to portions of fingers being moved. Afterward, when playing a multi-reactive video, the computer may output a video by extracting a plurality of regions (e.g. a background region, a region of the back of the hand, and a plurality of finger regions corresponding to each frame) necessary to play a specific basic video requested by the user's input manipulation.

The computer receives a multi-reactive video generation condition for the compressed video (S600). The multi-reactive video generation condition is a plurality of manipulation inputs corresponding to reactions capable of being generated in the compressed video. That is, the computer matches a plurality of user manipulations, which are to be connected to movements of various objects capable of being implemented through the compressed video, with each video section or frame, and then obtains the matched result.

An embodiment of the multi-reactive video generation condition refers to a condition that allows the basic video to react (i.e., providing an image frame corresponding to the user's touch manipulation in real time) by the user's touch manipulation. In this way, the user may visually perceive that an action in a video occurs (e.g., the movement of a manipulation object or object occurs depending on the user's touch manipulation) depending on the manipulation entered by him/her.

Besides, the computer performs a process of obtaining and compressing a plurality of basic videos for generating a multi-reactive video and then performs a process of connecting the user's input manipulation type to the multi-reactive video. For example, a computer connects each input manipulation of a user to a specific section video or one or more image frames within the compressed video. For example, in a process of generating a multi-reactive video, the computer connects the section video or image frame so as to be suitable for a location at which an input manipulation is provided, the type of the input manipulation, the intensity applied for a force touch, a pressing angle, a movement direction for a drag operation, or the like.

For example, the computer may match the manipulation of swiping a screen from right to left, which is entered by the user, with a section video indicating that a direction of a face that is an object is changed to the left in a state where the face faces the front, and then may connect a user manipulation of moving from right to left to the rotation of the face from the front to the left.

Also, for example, when a first basic video is a video indicating that the index finger is moved to the left with the other fingers folded, and a second basic video is a video indicating that the index finger is moved to the right, the computer obtains an input manipulation of touching an index finger region and dragging the index finger to the left from a creator client to match the input manipulation with the first section video, and obtains an input manipulation of touching the index finger region and dragging the index finger to the right to match the input manipulation with the second section video. The computer receives various input manipulations depending on the type of a basic video, matches and stores the various input manipulations.

Also, in an embodiment, the computer may be implemented to provide an image frame provided by the depth information change differently depending on a pressing method of an input manipulation. That is, the computer may be implemented such that different image frames are provided by the pressed angle, and thus the user may identify a reaction to which the pressing angle is actually reflected.

Moreover, in another embodiment, when a specific input manipulation satisfies a specific condition, a multi-reactive video generation condition means a condition that a specific portion included in a basic video is played (i.e., an action occurs). Also, in another embodiment, the multi-reactive video generation condition means a condition for generating a multi-reactive video such that a plurality of regions within a frame individually or simultaneously react through one basic video.

When the multi-reactive video generation condition is a condition for implementing a basic video as a multi-reactive video that responds depending on a user manipulation, a generation condition to be stored in a multi-reactive video generation file may be received in a different way depending on the type of the basic video.

In an embodiment, when the basic video is a video captured in a general manner, the computer receives data for setting a specific playback range and a region within the frame to implement a multi-reactive video. At this time, the computer may receive condition data from the user by executing a multi-reactive video generation file generation program.

In detail, the computer receives an input for specifying a specific playback range from the user. In other words, a plurality of detailed videos are stored in one file. When the computer generates a multi-reactive video indicating a movement to the desired location depending on the user's manipulation, a user may select frames from a specific start frame (i.e., the first frame of a time domain to be produced as a multi-reactive video) to a final frame (i.e., the last frame of a time domain to be produced as a multi-reactive video) of a basic video. When the condition matching a specific input manipulation is satisfied, the computer may play the selected frames.

Afterward, the computer receives a specific input manipulation to be connected to the entire region or specific region of the frame within the playback range from the user, or applies an input manipulation that matches the movement of the manipulation object by analyzing the movement of a manipulation object in the video. That is, the computer may receive or specify the input manipulation matching the movement of an object within the specified playback range.

In addition, various methods may be applied as a method of connecting the playback range (or a section video) of a basic video or a compressed video to the input manipulation.

In an embodiment of a method of connecting a playback range to a specific input manipulation, the computer may apply a method of generating a virtual layer in the entire region or a specific region of each frame within a specified playback range. The virtual layer may mean a layer that is capable of receiving a user input without visually appearing on a screen and is overlaid on the frame. That is, the computer obtains a condition (i.e., a time range in which the virtual layer will be generated, the number of frames in which the virtual layer will be generated, a range on the frame, or the like) for generating a virtual layer composed of the specific number of detailed cells on a frame, from the user. When playing a multi-reactive video, the computer provides the basic video with a virtual layer generated by dividing into the specific number of detailed cells based on the virtual layer generation condition included in the multi-reactive video generation file. The number of detailed cells into which the virtual layer is divided may be determined depending on the number of image frames, which are to be matched and which are included in the virtual layer generation condition. For example, when the user desires to generate a multi-reactive video such that 'n' frames are played (i.e., play manipulation) variably depending on the multi-reactive video generation condition (i.e., a virtual layer generation condition), the computer may divide a specific region into 'n' sub-cells.

Also, in another embodiment, when the basic video is a combination of a plurality of image frames that store image frames for each location of an object in space, the computer receives a condition setting for matching a specific frame with each point on a touch screen from the user.

In detail, the computer receives an input for setting a region, which is to be generated reactively in a plurality of image frames in the basic video, from the user. In an embodiment, the computer receives an input for setting the reaction-type region to the specific image frame, from the user. For example, the computer may extract and provide a specific image frame in the base video on a screen and may allow a user to assign a range of an object. The locations of the camera and object are fixed in the base video, and thus the computer may provide an arbitrary image frame and then may set the region of the object through a touch manipulation. In addition, in another embodiment, the computer extracts an object image, which is identically present in a plurality of frames in the basic video, from the user and receives and executes a command for implementing the extracted result as a reactive generation region. Moreover, in another embodiment, the computer tracks the movement of a manipulation object (e.g., a hand) and then receives a command for implementing a range including a movement path of the manipulation object (e.g., a hand) as a reactive generation region from the user.

Afterward, the computer receives a density setting to be entered through a touch manipulation from the user. That is, the computer receives the number of frames to be matched with the reactive region. For example, when the basic video consists of L (the number of time frames)×M (the number of event frames)×N (the number of depth frames), a frame density less than or equal to "L×M×N" may be applied to the reactive generation region. As such, when playing a multi-reactive video, the computer divides the reactive generation region based on the set density, matches an image frame corresponding to a plurality of sub-cells constituting the reactive generation region with each sub-cell, and implements the multi-reactive video.

Also, in another embodiment, when a frame corresponding to a user manipulation is set to be provided, the computer receives a specific playback condition from the user. The playback condition means that playback is performed by continuing playback or moving the playback point to a specific time point when the condition is satisfied.

For example, the computer receives a specific input condition. That is, the computer receives a push manipulation for a specific point, a drag manipulation for a specific range, or a pinch manipulation for a specific range. After that, the computer receives a playback condition that will occur when the corresponding input condition is satisfied. The computer may be configured to play (i.e., move to a specific image frame and then play the specific image frame or play a specific section from a first image frame to a second image frame) a specific playback range. When an input condition is satisfied, the computer may provide a specific link. In addition, the computer may be configured to combine or replace all regions or some regions within a frame of a specific playback range with another video.

Also, in another embodiment, the computer provides one screen with a plurality of multi-reactive videos and forms a connection relationship between multi-reactive videos. For example, when forming the connection relationship between two multi-reactive videos, the computer forms the final multi-reactive video in which the first multi-reactive video and the second multi-reactive video are combined to each other. When a user manipulation for a specific multi-reactive video occurs, not only a reaction (i.e., an action) occurs in the corresponding multi-reactive video, but also an action according to the connection relationship occurs in the other multi-reactive video. In detail, in the case where the first multi-reactive video expresses the user's face image, and the second multi-reactive video expresses only some skin regions included in the user's face, when the computer repeatedly receives a drag manipulation such as applying color cosmetics to the second multi-reactive video from the user, the computer implements an action of skin makeup (e.g., sequentially play videos indicating that a face image without color makeup is changed to a face image with color makeup) by playing the first multi-reactive video connected to the second multi-reactive video. Moreover, the type of an action generated in a first multi-reactive video and a second multi-reactive video may be different depending on the type of a manipulation input to the second multi-reactive video.

However, the number of multi-reactive videos capable of forming a connection relationship is not limited, and a connection relationship with a plurality of multi-reactive video may be formed in one multi-reactive video. For example, the computer may provide 16 individual multi-reactive videos into 16 divisions in one screen, and may form the connection relationship between respective multi-reactive videos.

The computer sets a multi-reactive video generation condition (e.g., an input condition and playback condition for a multi-reactive video) in various manners. In an embodiment, the computer directly receives a condition function for implementing the reaction in a multi-reactive video. That is, the computer may directly receive a function code that implements the response from the user. For example, when a frame set including a plurality of videos is provided on a screen (i.e., when the first multi-reactive video and the second multi-reactive video are combined with each other), the computer receives two multi-reactive video functions from the user.

Moreover, in another embodiment, the computer implements a multi-reactive video by directly inputting a multi-reactive video generation condition entered from the user into the basic video by using a multi-reactive video generation file implementing program. The computer launches the multi-reactive video generation file implementing program and may load a specific basic video by the user's manipulation. Afterward, the computer receives a manipulation corresponding to a generation condition (i.e., an input condition, a playback condition, or the like) to be implemented with a multi-reactive video from the user, and a multi-reactive video generating program or generating application generates a function for implementing the corresponding generation condition.

As will be described later, when a multi-reactive video generation file that is played together with one or more basic videos is present separately, the computer stores the generation condition entered from the user in the multi-reactive video generation file through the generation file implementing program. For example, the computer stores a multi-reactive video implementing function code corresponding to the generation condition as a separate file. The computer may receive a manipulation (e.g., a touch manipulation, a mouse manipulation, or the like) on the basic video and may record the corresponding condition (e.g., an action type, a playback range in which an action is input, an action to be executed when a condition is satisfied, or the like) on the multi-reactive video generation file.

Moreover, in another embodiment, in the case where the multi-reactive video generation condition is a condition that a specific action (e.g., a video of specific portion included in the basic video) is played when a specific input manipulation satisfies a specific condition, the computer receives a specific input manipulation type, an action type (e.g., a playback time point to be moved within the basic video) generated when a condition is satisfied, and a condition value to be satisfied from the user.

Moreover, in another embodiment, when the multi-reactive video generation condition is a condition for generating a multi-reactive video such that a plurality of regions within a frame react individually or simultaneously through one basic video, the user sets a playback range, which is to be divided or cropped by the computer, and sets a region, which is to be divided or cropped within the corresponding range by the computer. Afterward, the computer receives video information, which is to be individually played in a region to be divided or cropped, from the user. For example, when the basic video is a video indicating that water is sequentially poured into cups positioned on the left and right, the frame may be divided based on a dividing line where the two cups are divided, and both the divided frames may be independently implemented reactively. In this way, various multi-reactive videos may be implemented with one basic video, thereby reducing the capacity of the multi-reactive video, and simplifying the capture of the basic video for implementing a multi-reactive video.

The computer generates a multi-reactive video by applying the generation condition to the compressed video (S800). The computer applies a multi-reactive video generation condition and stores multi-reactive video data.

In an embodiment, the computer generates a final multi-reactive video file by reflecting the result of compressing a plurality of basic videos and obtaining an input manipulation for each basic video. That is, the computer merges a plurality of regions compressed depending on the user's input manipulation to build a file in a form in which a specific action is capable of being played in a multi-reactive video.

Moreover, in another embodiment, when the computer directly receives the multi-reactive video generation condition from the user in a form of a function, the computer stores a function form input in the multi-reactive video generation file, which is used together with one or more basic videos, as it is. In another embodiment, when directly receiving a specific input manipulation to the basic video by using a multi-reactive video generation file production program (or generation program) from the user, the computer generates and stores a function corresponding to the corresponding input manipulation. In other words, in a multi-reactive video generation condition entered for the basic video by the user, the computer may extract data such as a frame, a range within the corresponding frame, and a response (i.e., an action) type and may store the extracted data in a form of a function.

In this way, the user may easily implement a specific video as a multi-reactive video by using the multi-reactive video generation file in which the multi-reactive video generation condition is stored. In other words, when the user desires to play a basic video itself, the basic video except for the multi-reactive video generation file may be just played. When the user desires to implement a multi-reactive video, the multi-reactive video may be played by playing a basic video file and the multi-reactive video generation file together.

Moreover, the method further includes generating, by the computer, a storage format of the stack structure based on a relationship between section videos in a compressed video. For example, the computer may build a frame or a plurality of regions, which are obtained in a compression process, so as to have a stack structure. That is, the computer generates a multi-reactive video file by stacking a plurality of regions, which are generated for video compression within a frame range (i.e., two-dimensional range) of the basic video, in one or more stacks.

In detail, when an input manipulation from the user is applied, the computer sets a set of locations, at each of which a specific extraction region needs to be provided, to a display range of the corresponding extraction region. For example, a background region needs to be displayed in all locations at each of which an input manipulation is provided, and thus the computer sets the entire frame to the display range of the background region. Moreover, the computer may store a change or according to force touch intensity at each location or over time through stacks.

Moreover, when implementing a plurality of operations at different locations within one multi-reactive video, the computer forms a stack for each operation implemented at a plurality of locations. In this way, when the user enters an input manipulation for implementing a plurality of operations at once while a multi-reactive video is played, the computer may output a video, to which a movement according to a plurality of input manipulations are reflected at once, by extracting and merging extraction regions from a stack, to which each input manipulation is applied.

For example, for a multi-reactive video including a first manipulation of opening a mouth and a second manipulation of moving food into the mouth, when the user enters the first input manipulation (e.g., a manipulation of touching upper and lower lip locations with two fingers and opening the mouth) for opening the mouth and the second manipulation of touching food and dragging the food towards the mouth at the same time, the computer merges a first extraction region, which is extracted from a stack at a location where a manipulation of opening the mouth is entered, merges a second extraction region extracted from a stack at a location where a manipulation of moving food is entered, and generates an output video.

In this way, the computer may provide output videos different depending on input levels of the first input manipulation and the second input manipulation. For example, when only the first input manipulation is entered, the computer provides an output video indicating that the mouth is opened. When only the second input manipulation is entered, the computer provides an output video indicating that the food is moved towards the mouth. When the first input manipulation and the second input manipulation are entered simultaneously, the computer provides an output video indicating that the food is entered into the mouth while the mouth is opened. Moreover, the computer may provide different output videos depending on a pattern to which the first input manipulation and the second input manipulation are applied.

Figure 5:
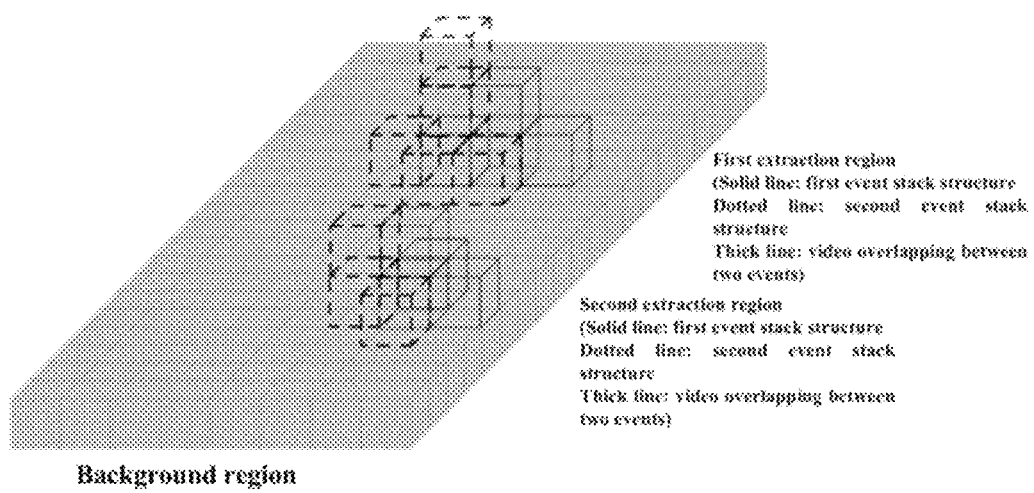
FIG. 5 is an exemplary view illustrating a stack structure of a compressed video, according to an embodiment of the inventive concept.

Furthermore, as illustrated in FIG. 5, each extraction region (a first extraction region and a second extraction region) may include a plurality of stacks for different events. For example, a first stack expressed by a solid line and a second stack expressed by a dotted line may be included in each extraction region. The computer may be implemented to determine a stack, which is executed, from among the first stack and the second stack based on a location where the first manipulation is entered from the user into each extraction region.

Also, as illustrated in FIG. 5, a first event and a second event within each extraction region may include overlapping pixels. The computer may store only one of overlapping pixels among a stack for the first event and a stack for the second event. Even though the compressed video includes only a piece of data for the overlapping pixels within a specific extraction region, the stack of one of the first event and the second event may be determined depending on the user's next manipulation (e.g., a change of movement direction of a touch manipulation or a change of applied pressure strength). In this way, the computer may generate the compressed video with minimal data.

Hereinafter, a method in which a user employs a multi-reactive video will be described.

According to an embodiment of the inventive concept, a method for playing and using a multi-reactive video includes loading, by a client, a specific multi-reactive video, receiving a user manipulation for the multi-reactive video, and calculating and outputting a reaction according to the user manipulation (a response outputting step).

In the response outputting step, the computer (i.e., a client device that plays a multi-reactive video) calculates a movement direction, a speed, an input angle to a screen, an input time length, pressure strength, or the like of the touch manipulation applied to a display.

For example, when a user (hereinafter referred to as a "second user") playing a multi-reactive video vertically applies pressure to the screen of a client (hereinafter referred to as a "second client") playing a multi-reactive video, or when the user obliquely applies pressure to the screen, the user may select and provide different sub-cells. When a real object is pressed in a vertical direction, the real object is dented in the vertical direction. When a real object is pressed in an oblique direction, the real object is dented in the oblique direction. As such, to provide realism to the second user even in the reactive video, there is a need to implement another movement of the object by playing different image frames depending on a pressing method, even when pressure is applied to the same point.

To this end, the second client may distinguish between pressurization methods in various manners. For example, the second client may determine a pressurization method based on a cross-sectional shape (e.g., the number of pixels in contact with a finger and the distribution of pixels in contact with a finger) of a finger touching a screen.

Moreover, for example, the second client may determine the pressurization method based on the pressure distribution applied on a screen. That is, the second client may determine the pressurization method, in which pressure is being applied to the screen by the user, depending on whether the overall pressure intensity applied to a range where a touch manipulation is entered is uniform, or whether the applied pressure intensity is different for each portion.

Moreover, for example, when pressing the screen by using a manipulation object (e.g., a finger), the second client may determine a pressing direction by measuring a minute movement of the finger on the screen.

When the pressurization method is determined to obliquely press an object, the second client provides a frame at a location in 2D space, in which a pressure direction in which pressure is applied is changed as depth information is changed. In detail, when the screen is pressed in an oblique direction, the second client provides an image frame at a point, at which the second user's finger is contacted, and then extracts and provides sub-cells corresponding to an extension line in a direction in which the finger is tilted as the pressure applied to the screen increases.

Moreover, according to another embodiment of the inventive concept, when a playback request for the basic video is received, the method further includes loading, by the computer, a multi-reactive video generation file together to implement a multi-reactive video. For example, when the multi-reactive video generation file is included in a folder where the basic video is stored or the corresponding multi-reactive video generation file in a database is matched, the computer may play the multi-reactive video generation files together when playing the basic video so as to implement the multi-reactive video.

Moreover, according to another embodiment of the inventive concept, the method further includes obtaining, by the computer, data such as the number of manipulations entered into the multi-reactive video, a manipulation range in a frame, and pressure intensity applied in the frame from the user. For example, the computer records input manipulation details entered into the multi-reactive video by the multi-reactive video generation file. In this way, companies using the multi-reactive video for marketing may identify the marketing effect of an object in the multi-reactive video.

Also, in another embodiment, when the user enters an input manipulation while employing the multi-reactive video, the computer stores an input manipulation pattern provided by the user in the specific multi-reactive video. Besides, the computer may match and store the output video data according to the input manipulation with the input manipulation pattern together. In this way, the computer may grasp the user's propensity by inputting each user's input manipulation and output video data to deep learning. For example, the computer may grasp the degree of interest in a specific object, or the like through an object in the multi-reactive video, to which the input manipulation entered by user is applied, or a pattern of the input manipulation entered by the user.

In detail, an interaction data analyzing method for understanding the user's act based on a user input manipulation entered into the multi-reactive video is described as follows. For example, in content associated with a cat, the computer may distinguish between 'repeatedly drawing a trajectory while slowly applying a weak force by using an object' and 'repeatedly drawing a trajectory while quickly applying a strong force with a short time difference' and then may distinguish whether the user is touching the object with affection for the object, or whether the user is touching the object with rejection or negative psychology. In this way, the computer may grasp the user's intent and desire. Furthermore, hyper-personalization may be implemented by providing a user manipulation pattern, to which each user's characteristic is reflected, and thus the computer may use the user manipulation pattern (i.e., interaction data) as identification data (e.g., a manipulation pattern fingerprint) capable of identifying the user. Moreover, it may be used as a gesture-type action ripple including the user's emotions.

Besides, in another embodiment, the method may further include providing, by the computer, reactive video content depending on a user's request. The computer receives pieces of information about interactive sections in video data from meta data and converts the pieces of information into a multi-reactive video. The computer may output different reactions depending on the type (e.g., a difference in an angle at which a user manipulation is applied, or the like) of a user manipulation entered into multi-reactive video data. Moreover, the computer may grasp the meaning of the action by analyzing and predicting a plurality of trajectories (e.g., a user's manipulation form, manipulation type, or the like) of objects interacting with content in real time. In addition, the computer may match the corresponding event to a reaction form corresponding to the meaning and then may output the matched result. Moreover, the computer may rearrange the mapping data in real time depending on an event according to the reaction form.

Hereinafter, a detailed description of a reactive-video-based service providing method according to an embodiment of the inventive concept will be described.

Figure 6:
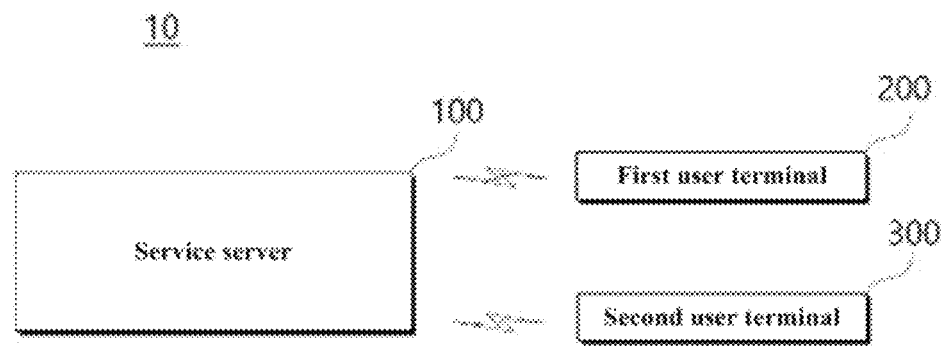
FIG. 6 is a diagram illustrating a network structure for a multi-reactive-video-based service providing system, according to an embodiment of the inventive concept.

FIG. 6 is a diagram illustrating a network structure for a multi-reactive-video-based service providing system, according to an embodiment of the inventive concept. Hereinafter, descriptions in FIG. 6 will be given with reference to FIGS. 7A to 7D.

Referring to FIG. 6, a reactive-video-based service providing system 10 according to an embodiment of the inventive concept includes a service server 100, a first user terminal 200, and a second user terminal 300. However, for convenience of description, the single first user terminal 200 and the single second user terminal 300 are illustrated. However, the plurality of first user terminals 200 and the plurality of second user terminals 300 are present, and an embodiment is not limited thereto.

The first user terminal 200 is a terminal of a user who desires to provide a multi-reactive video to the second user terminal 300. To use a multi-reactive-video-based service, the first user terminal 200 captures at least one basic video including a specific object and then transmits the at least one basic video to the service server 100. At this time, when the first user terminal 200 transmits the at least one basic video, the first user terminal 200 may request the generation of the multi-reactive video based on the corresponding region by setting and transmitting a region (a region of the object) to be generated reactively in a plurality of image frames in each base video.

When the service server 100 receives at least one basic video from the first user terminal 200, the service server 100 generates and uploads a multi-reactive video based on at least one basic video at the request of the first user terminal 200. When manipulation input information based on the multi-reactive video is received from the second user terminal 300, the service server 100 plays a reactive video matching the response map data based on that manipulation input information so as to be provided to the second user terminal 300.

To this end, the multi-reactive video may include at least one of correction video data, response map data, and response trigger data.

In detail, the correction video data may be data including information about a combination of images generated through segmentation or correction to implement a reactive video, and may correspond to compressed data, that is, the compressed video described above. For example, the correction video data may correspond to data of the above-described stack structure, or the like, and may also be automatically generated based on artificial intelligence.

Moreover, the response map data may be data including information to be implemented as a multi-reactive video in combination with a specific region of the correction video data, and may include a multi-reactive video generation condition described above. The response map data may serve to connect an image frame constituting the correction video data to a manipulation location on a display, and may include data for mapping an image frame (or image information) onto a specific manipulation location or range. For example, the response map data serves to connect a range or location on the screen to an identification value (e.g., an address) of a specific image frame.

Besides, response video data may be data including information about a user manipulation entered into a multi-reactive video, and may correspond to the manipulation input information described above.

When the correction video data is combined to the response map data, a multi-reactive video to be output reactively is generated depending on a user manipulation. When the response trigger data is combined, a video where a specific reaction is output is generated.

Besides, the multi-reactive video may further include response script data. The response script data is associated with a condition of image information provided depending on the manipulation of the second user. That is, the response script data may correspond to a reaction condition set by a multi-reactive video creator. When the multi-reactive video is combined to the correction video data, the response map data, and the response script data, the multi-reactive video may be implemented such that different responses are implemented depending on a condition achieved as the user enters a manipulation.

In detail, when the service server 100 generates a multi-reactive video based on at least one basic video received from the first user terminal 200, the service server 100 generates correction video data (a compressed video) including only the movement of an object based on at least one basic video. For example, assuming that a first basic video and a second basic video including the same object are received, when the object included in both videos includes a movement for the same path, the service server 100 extracts a section video including the movement on the same path from the first basic video and the second basic video, determines the extracted section video as a redundant section video, and stores only the redundant section video included in one of the first basic video and the second basic video.

Afterward, the service server 100 identifies a movement of the object in each basic video and generates and stores the response map data (a multi-reactive video generation condition) that maps the image frame onto a specific manipulation location or a range by the second user. At this time, the service server 100 implements opposite movements to each other in the two basic videos through playback or reverse playback without generating data separately. Accordingly, the multi-reactive video is generated by combining a compressed video with the response map data.

Next, when manipulation input information (response trigger data) based on the multi-reactive video is received from the second user terminal 300, the service server 100 provides the response map data to the second user terminal 300 by playing the matched reactive video based on the manipulation input information.

Furthermore, the multi-reactive video may be formed in a form of at least one of multi touch, multi actions, multi objects, multi scenes, multi outcomes, and multi reactions.

Figure 7A:
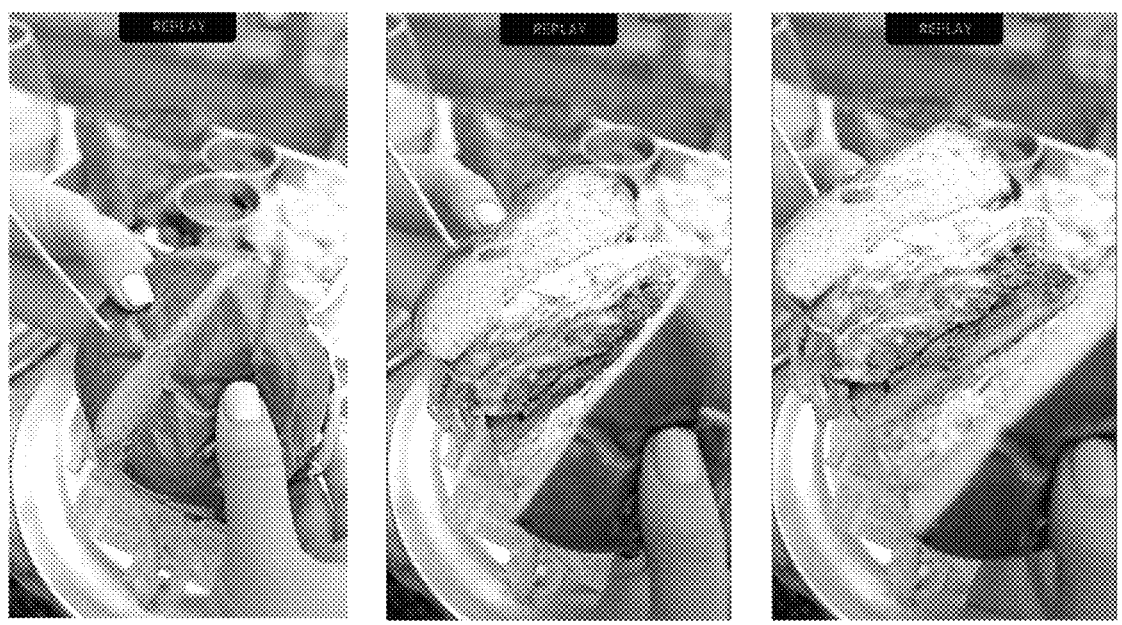
FIGS. 7A to 7D are diagrams illustrating examples of a multi-reactive video implemented according to an embodiment of the inventive concept.

In detail, the multi touch may be a reactive video configured to react to a plurality of contacts. When a user enters a user manipulation including a plurality of contacts based on the multi-reactive video displayed on the user's terminal, the reactive video corresponding to the manipulation may be implemented. For example, as illustrated in FIG. 7A, when the user enters a user manipulation of touching each portion of a hamburger thus bisected with his/her fingers and spreading each portion in opposite directions, the reactive video indicating that the bisected hamburger is spread is played.

Figure 7B:
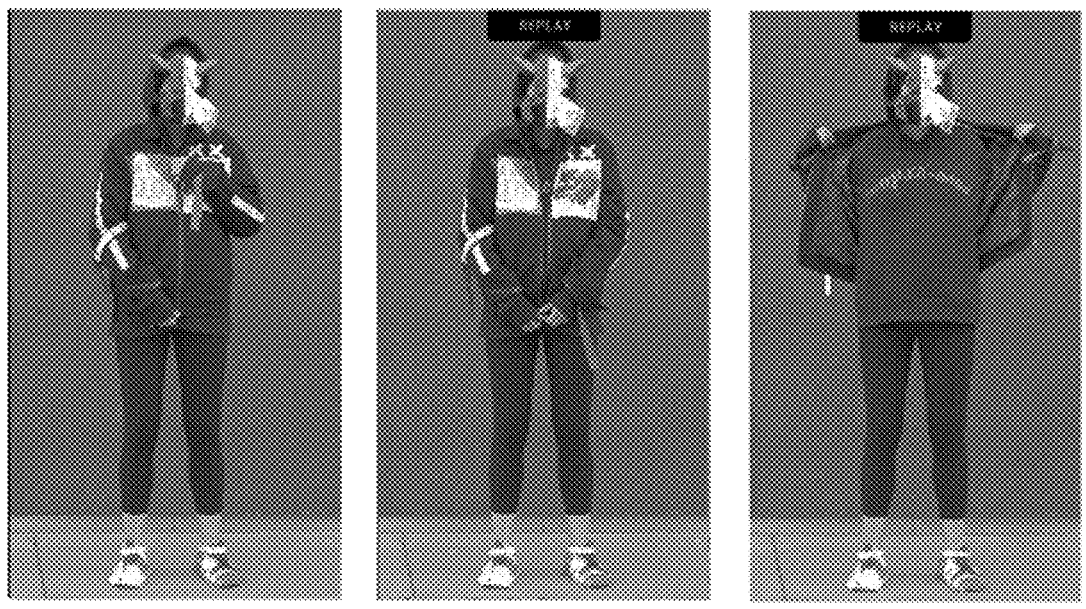
Figure 7B:
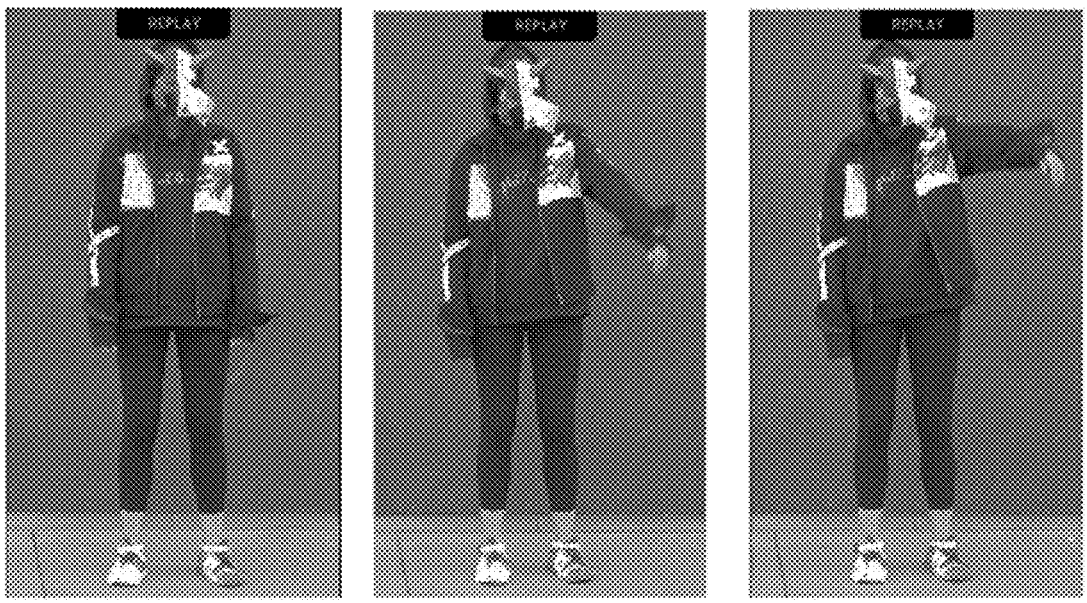

Moreover, the multi actions are reactive videos configured to react to a plurality of user manipulations, and provide actions respectively corresponding to the plurality of user manipulations. For example, as illustrated in FIG. 7B, when a user enters a user manipulation of opening a zipper based on the multi-reactive video displayed on the user's terminal in a state where the user touches the zipper, a reactive video indicating that the object opens the zipper in the basic video is played. When the user enters a user manipulation of lifting a hand of the object upward based on the multi-reactive video displayed on the user's terminal in a state where the user touches the hand of the object, a reactive video indicating that the object raises the hand is played.

Figure 7C:

Besides, as illustrated in FIG. 7C, the multi objects are reactive videos configured to react individually to each of a plurality of objects included in the multi-reactive video.

Figure 7D:
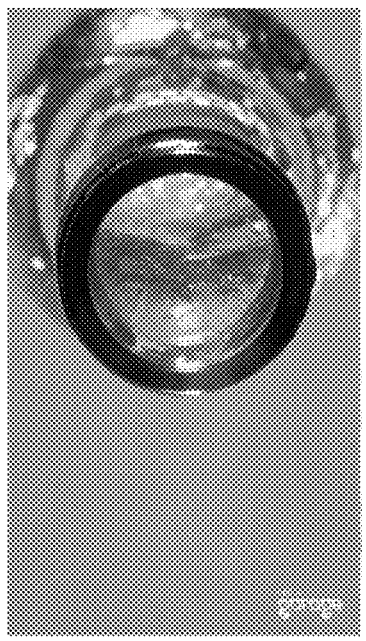
Figure 7D:
Figure 7D:
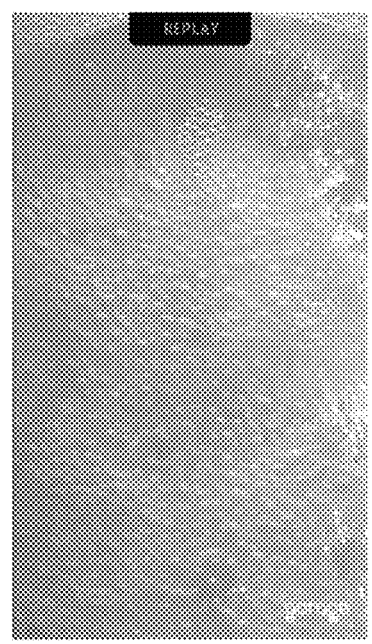

Also, the multi scenes are reactive videos provided while a plurality of scenes for a user manipulation are included. For example, as illustrated in FIG. 7D, when the user enters a user manipulation of lowering a top of a bottle based on the basic video in a state where a user touches the top of the bottle, a reactive video including a video indicating that a beverage is poured when the bottle is tilted and a video indicating that a glass is filled with a beverage is played.

In addition, the multi outcomes are reactive videos in which different results are selectively provided in response to a preset condition depending on a user manipulation. For example, as illustrated in FIG. 3, when the user enters a user manipulation of lifting a balloon up based on the basic video while touching the balloon, the balloon is dropped after the balloon is fully lifted or after the touch is released. A reactive video indicating that the balloon pops up or a reactive video indicating that the balloon doesn't pop, but hits a floor and bounces is played depending on a speed at which the user enters the user manipulation of lifting the balloon.

In addition, the multi reactions are reactive videos in which different reactions are provided from an object in the basic video in response to a preset condition depending on a user manipulation. This may be provided as illustrated in FIG. 2. In other words, a reactive video is played depending on the type of a user manipulation performed by the user on an object in the basic video such that the expression of the object is also changed depending on the speed of the user manipulation while the user takes a reaction of turning his/her head in one of up, down, left, and right directions.

In other words, a multi-reactive video is provided as a matching reactive video in response to a user manipulation. When manipulation input information including at least one of the number of manipulations, manipulation intensity, a movement length, a manipulation speed, a manipulation time length, a manipulation direction, and a manipulation location is received from the second user terminal 300 as information about a user manipulation, the service server 100 identifies a user manipulation in consideration of reference values based on the received information, and transmits playback information about a reactive video matching the user manipulation to the second user terminal 300. Accordingly, the second user terminal 300 may implement a reactive video depending on the playback information.

When providing a multi-reactive video, the service server 100 may further include a guide point that induces a user manipulation. In this way, the user may determine the type of a manipulation performed by him/her, based on the multi-reactive video.

In the meantime, the service server 100 may accumulate and store manipulation input information received from the second user terminal 300, may analyze the accumulated manipulation input information, and may provide an advertiser client (a first user who employs a service, a user who desires to employ the service, or the like) with the analysis result, to which the interest of at least one or more users is reflected, for a product or service.

At this time, in addition to manipulation statistics, the analysis result may include information about the manipulation patterns preferred by users. In this way, a company or individual using the multi-reactive-video-based service may produce advertisement (promotion) content for the product or service to be sold in consideration of the analysis result, thereby improving the advertising impact.

In detail, the service server 100 may provide an advertiser client with heat map data for each reactive video as analysis result data. For example, when a plurality of manipulations are included in one reactive video, the advertiser client may determine a manipulation for the product or service which users are interested in, a manipulation pattern which users are highly interested in, or the like through a heat map.

Meanwhile, when receiving a clip save request for a specific reactive video for advertising, the service server 100 may connect the reactive video for advertising to an application of a user so as to be identified by the application.

The second user terminal 300 may be a terminal of the second user in which a multi-reactive video is implemented. The second user terminal 300 may receive the multi-reactive video by launching a separate application or accessing a website through the terminal. That is, when the second user performs a user manipulation based on the multi-reactive video displayed on the second user terminal 300, the second user terminal 300 generates manipulation input information based on the entered user manipulation and transmits the generated manipulation input information to the service server 100.

Figure 8:
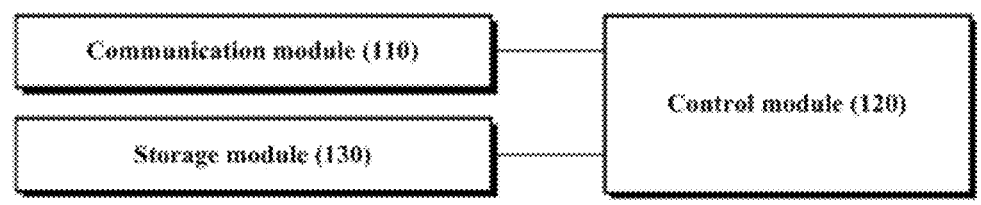
FIG. 8 is a diagram illustrating a configuration of a service server for providing a service based on a multi-reactive video, according to an embodiment of the inventive concept.

FIG. 8 is a diagram illustrating a configuration of a service server for providing a service based on a multi-reactive video, according to an embodiment of the inventive concept.

Referring to FIG. 8, the service server 100 for providing a multi-reactive-video-based service may include a communication module 110, a storage module 130, and a control module 150.

The communication module 110 transmits and receives at least one information or data with the first user terminal 200 and the second user terminal 300. Moreover, the communication module 110 may communicate with other devices, and may transmit and receive wireless signals over a communication network according to wireless Internet technologies.

For example, the wireless Internet technologies includes wireless LAN (WLAN), Wireless-Fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like. The service server 100 transmits and receives data depending on at least one wireless Internet technology within a range including Internet technologies not listed above.

Short-distance communication may be supported by using at least one of Bluetooth™, radio frequency identification (RFID), infrared data association (IrDA), ultra wideband (UWB), ZigBee, near field communication (NFC), Wi-Fi, Wi-Fi Direct, and wireless universal serial bus (Wireless USB) technologies, as for short range communication. As such, wireless area networks may support wireless communication between the service server 100 and the first user terminal 200, and between the service server 100 and the second user terminal 300. In this case, the wireless area networks may be wireless personal area networks.

The storage module 130 stores at least one process required to provide a multi-reactive video based service. In addition, the storage module 130 may further store processes for performing other operations, but is not limited thereto.

The storage module 130 may store data for supporting various functions of the service server 100. The storage module 130 may store a plurality of application programs (or applications) running in the service server 100, data for an operation of the service server 100, and instructions. At least part of the application programs may be present for basic functions of the service server 100. In the meantime, the application program may be stored in the storage module 130, may be installed in the service server 100, and may be driven by the control module 150 so as to perform an operation (or function) of the service server 100.

In detail, the storage module 130 stores at least one basic video received from the first user terminal 200 and multi-reactive video generated based on the at least one basic video. At this time, the multi-reactive video generation file may be included in a folder where the basic video is stored, or the corresponding multi-reactive video generation file may be matched in a database. Accordingly, when a basic video is played, the multi-reactive video generation file is played together to implement the multi-reactive video.

In addition to an operation associated with the application program, the control module 150 may generally control overall operations of the service server 100. The control module 150 may provide or process appropriate information or functions to users, by processing a signal, data, information, or the like, which is input or output, through the above-described components, or driving the application program stored in the storage module 130.

When at least one basic video is received from the first user terminal 200, the control module 150 generates a compressed video based on the received at least one basic video, identifies the movement of an object in each basic video, generates a multi-reactive generation condition that an image frame is mapped onto a specific manipulation location or range, and generates a multi-reactive video.

Afterward, the control module 150 uploads the multi-reactive video and then identifies the uploaded result through the second user terminal 300. When manipulation input information based on the uploaded multi-reactive video is received from the second user terminal 300, the control module 150 plays the multi-reactive video by applying the manipulation input information to the multi-reactive video.

In the meantime, the control module 150 accumulates the manipulation input information received from the second user terminal 300 (i.e., at least one second user) in the storage module 130 and then stores the accumulated results. The control module 150 analyzes the stored manipulation input information depending on a preset cycle or request, and then provides the analysis result to the first user terminal 200 (i.e., at least one first user).

Meanwhile, the multi-reactive generation condition may be additionally set for the uploaded multi-reactive video by the second user. When request information is input or received from the second user terminal 300, the control module 150 obtains an element video based on the request information, and then generates a plurality of response videos obtained by transforming the obtained element video based on artificial intelligence. At this time, because it is impossible to obtain all responses (e.g., facial expressions or actions) of an object (e.g., a specific character), the control module 150 implements more responses by transforming the element video including some responses capable of being obtained. Herein, the request information is information including a request for the format of a video, which the second user desires to play, based on a multi-reactive video and may be stored in a form of comments on SNS or the like.

For example, when a celebrity provides an SNS service capable of communicating with fans, the celebrity or his/her agency generates and uploads a reactive video associated with the celebrity onto the SNS service, and the second user, who is a fan, enters the desired manipulation into the reactive video provided through a user client. The control module 150 receives a user manipulation or video generation data from the second user terminal and stores the user manipulation or the video generation data together with the comments on an SNS. When another SNS user or celebrity selects a tab corresponding to the video generation data of the second user, a video obtained by applying the video generation data to a reactive video on an SNS may be provided.

In this way, a multi-reactive video customized for at least one respective second user may be generated.

Figure 9:
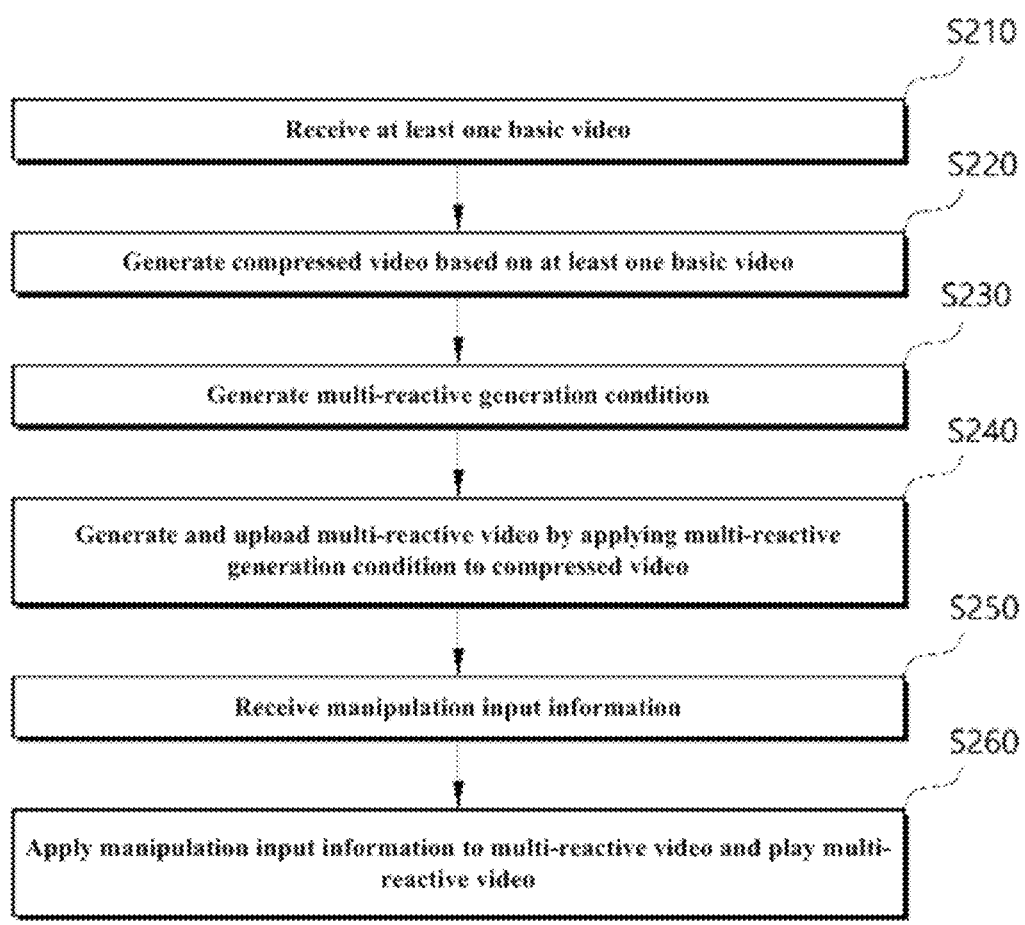
FIG. 9 is a flowchart of a multi-reactive-video-based service providing method, according to an embodiment of the inventive concept.

FIG. 9 is a flowchart of a multi-reactive-video-based service providing method, according to an embodiment of the inventive concept.

First of all, when receiving at least one basic video from the first user terminal 200 (S210), the service server 100 generates a compressed video based on the received at least one basic video (S220).

Afterward, the service server 100 generates a multi-reactive generation condition that a specific manipulation location or range is mapped onto an image frame by identifying a movement of an object in each basic video (S230), and then generates and uploads a multi-reactive video by applying the multi-reactive generation condition generated in step S230 to the compressed video generated in step S220 (S240). In this case, the multi-reactive video may be a specific platform, SNS, application, or the like.

Next, when manipulation input information based on the multi-reactive video is received from the second user terminal 300 (S250), the service server 100 applies the manipulation input information to the multi-reactive video and then plays a video (S260). According to an embodiment of the inventive concept, a reactive-video-based service providing method includes uploading a first reactive video at a request of a first user, receiving a manipulation of a second user for a first reactive video, generating response trigger data for applying the manipulation of the second user to the first reactive video; and applying and playing the response trigger data to the first reactive video when response implementation, to which the response trigger data according to the manipulation of the second user is applied, is requested.

The computer (e.g., a service server) uploads the first reactive video at a request of a first user. The first reactive video may be a video implemented by the first user so as to manipulate a specific object. For example, the first reactive video may be a video capable of implementing a reaction by entering a manipulation such as touching a celebrity's face.

The computer receives a manipulation of a second user for the first reactive video. The computer may enter a manipulation intended by each user into the first reactive video. For example, when the second user desires to enter a manipulation for the first reactive video, the service server provides the first reactive video data to a client device of the second user. The description of a process of processing the first reactive video in a user client will be described later in detail. As an example of a method of receiving the manipulation of the second user, when the first reactive video is a video capable of manipulating a celebrity's face, the second user manipulation may be a manipulation of touching the face of a celebrity as a fan.

The computer generates or receives response trigger data for applying the manipulation of the second user to the first reactive video. The response trigger data corresponds to the stored user manipulation for reactive video, and is used to play the reactive video depending on the stored manipulation as the response trigger data is played together with the reactive video. For example, when the second user enters a manipulation into the first reactive video provided to a user client, the service server generates response trigger data by receiving the manipulation of the second user or receives the response trigger data generated by the user client.

When response implementation, to which response trigger data according to the manipulation of the second user is applied, is requested, the computer applies and plays the response trigger data to the first reactive video. For example, when receiving a request for applying the response trigger data generated by the second user to the first reactive video from a specific user, the service server may transmit the regenerated video by applying the second video generation data to the first reactive video.

In detail, when a celebrity provides an SNS service capable of communicating with fans, the celebrity or his/her agency generates and uploads a reactive video associated with the celebrity onto the SNS service, and the second user, who is a fan, enters the desired manipulation into the reactive video provided through a user client. The service server receives user manipulation or video generation data from the user client of the second user and stores the user manipulation or the video generation data together with the comments on an SNS. When another SNS user or celebrity selects a tab corresponding to the video generation data of the second user, a video obtained by applying the video generation data to a reactive video on an SNS may be provided.

According to another embodiment of the inventive concept, a reactive-video-based service providing method includes receiving, by a service server, a user manipulation for a specific reactive video from a plurality of users and providing a manipulation statistical analysis result for the reactive video.

As a response according to the user's manipulation input is output, the reactive video provides advertising impact through user experience, and thus the reactive video may be produced as content for advertisement for a product or a service. At this time, the service server needs to provide advertisers with analysis data on interests of users in the product or a service.

The service server may provide an advertiser client with heat map data for each reactive video as analysis result data. For example, when a plurality of manipulations are included in one reactive video, advertisers may determine the manipulation of a product or service, which users are interested in, through a heat map. Furthermore, for example, the advertisers may grasp a manipulation pattern that users are interested in.

Moreover, the service server may offer advertisers a reactive video production direction for increasing interests of users.

According to still another embodiment of the inventive concept, a reactive-video-based service providing method includes receiving, by a service server, a request for storing a clip for a specific reactive video for an advertisement and connecting, by the service server, the reactive video for an advertisement such that the user's application is capable of identifying the reactive video for an advertisement.

According to yet another embodiment of the inventive concept, a reactive-video-based service providing method includes obtaining, by a service server, user information for accessing a specific reactive video, extracting interaction data based on the user information, and selecting response trigger data according to the interaction data to apply the selected response trigger data to a reactive video.

To automatically output different responses depending on users, the service server obtains the user information for accessing a specific reactive video. The user information may correspond to the user's user account.

Afterward, the service server extracts the interaction data based on the user information. The interaction data is data indicating the level of interaction between an object included in the reactive video and the user. For example, when an object in the reactive video is a human, the interaction data may include a relationship between the user and characters in the reactive video, and the frequency of online/offline interactions with each other.

The service server selects response trigger data according to the interaction data and applies the selected response trigger data to the reactive video. The service server extracts and applies the response trigger data for implementing the reaction corresponding to an interaction between the object and the user in the reactive video. For example, when the reactive video is obtained by implementing the expression and movement of a grandmother and a user is a grandson, the service server may extract and apply the response trigger data for implementing positive reactions such as smiling expressions based on interaction data having high affinity between the grandson and the grandmother.

Also, in another embodiment, the reactive-video-based service providing method further includes obtaining, by the service server, an element video for implementing a reactive video for a specific object and generating, by the service server, a plurality of response videos obtained by transforming the element video based on artificial intelligence. Because the service server may not obtain all responses (e.g., facial expressions or actions) of an object (e.g., a specific character), the service server implements more responses by transforming the element video including some responses capable of being obtained.

Hereinafter, a description of the structure of a reactive video according to an embodiment of the inventive concept will be described.

The reactive video according to an embodiment of the inventive concept includes correction video data, response map data, and response trigger data.

The correction video data corresponds to a combination of images generated through segmentation or correction to implement a reactive video. For example, the correction video data may correspond to data of the above-described stack structure.

The response map data is data that is coupled to a specific region of the correction video data and is implemented reactively. The response map data serves to connect an image frame constituting the correction video data to a manipulation location on a display.

In detail, the response map data maps specific manipulation locations or ranges onto image frames (or image information). For example, the response map data serves to connect a range or location on the screen to an identification value (e.g., an address) of a specific image frame.

The response trigger data is data for a user manipulation entered into a reactive video.

When the correction video data is combined to the response map data, a reactive video to be output reactively is generated depending on a user manipulation. When the response trigger data is combined, a video where a specific reaction is output is generated.

Besides, the reactive video may further include response script data. The response script data is associated with a condition of image information provided depending on a user manipulation. That is, the response script data may correspond to a reaction condition set by a reactive video creator. When the reactive video is combined to the correction video data, the response map data, and the response script data, the reactive video may be implemented such that different reactions are implemented depending on a condition achieved as the user enters a manipulation.

Hereinafter, a reactive video playing method according to an embodiment of the inventive concept will be described.

According to an embodiment of the inventive concept, a method for playing a reactive video includes obtaining, by a service server, a manipulation location of the reactive video from a user client, transmitting, by a service server, an address for a manipulation location to the user client, the address being frame information to be output by a client, and performing, by a user client, real-time output through image processing corresponding to the address.

When the user client stores the reactive video as it is, there is a risk that the reactive video will be leaked, and thus there is a need for a method for increasing security. To this end, it is possible to store only pieces of image information constituting a reactive video in a user client. For example, the user client may increase security by dividing frames constituting the reactive video in the compression process and changing the stored order of each frame instead of storing the reactive video as it is. However, when the user client stores image information in this manner, there is a need for a method for outputting a reactive video depending on a user manipulation.

First, the service server obtains a manipulation location of a reactive video from a user client. That is, the service server receives a portion, which is reactively output through a manipulation entered by the user, from the user client. For example, the service server receives manipulation location data on a touch display of the user client.

Afterward, the service server transmits an address for a manipulation location to the user client. The address is frame information (i.e., an identification value of a frame) to be output from among those stored in the client.

Afterward, the user client processes an image corresponding to the address and outputs the processed result in real time.

Moreover, the manipulation location obtaining step may further obtain time data, at which a user manipulation is entered, or pressure strength at which a user manipulation is entered. There is a need to output different frames depending on the pressure strength or time point at which the user enters a manipulation, and thus the service server receives a manipulation time length or pressure intensity together with a manipulation location (x-y coordinates) from the user client.

Moreover, a reactive-video-based service providing method according to an embodiment of the inventive concept is implemented such that the computer moves response map data depending on a video playback time. In this way, a reaction may be implemented by inputting the user's manipulation while the video is played.

For example, while a video indicating that a person is walking is played, different frames may be played (e.g., play a video indicating a location where the character falls, differently depending on a manipulation location) depending on a location where the user enters a manipulation.

To this end, the computer may set the location of the response map data so as to be changed over time and may set the frame, which is mapped onto each division on the response map data, differently depending on the manipulation time point (i.e., a playback time in the video). That is, the computer may map different image information onto the combination of a division value on response map data, in which the user's manipulation is entered, and a time value at which the manipulation is entered.

The multi-reactive video production and service method according to an embodiment of the inventive concept may be implemented by a program (or an application) and may be stored in a medium such that the program is executed in combination with a computer being hardware.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

First, various actions (i.e., reactions) may be applied as the multi-reactive video generation file is played with a general video or a combination of a plurality of image frames.

Second, unlike a conventional media simply limited by a time axis, it is possible to provide a user with a multi-reactive video, which is variously output depending on an event as a specific condition is set for a video through a multi-reactive video generation file, it is possible to provide a user with a multi-reactive video to which various events is applied.

Third, various actions may be implemented based on a single captured image by applying image segmentation or cropping to a video frame.

Fourth, it is possible to grasp a user's reaction to a video by recording manipulation details for a specific user's video through a multi-reactive video generation file. For example, it is possible to grasp the number of touch manipulations to the user's multi-reactive video, a frame in which a touch manipulation has been performed, and an object in the frame, or the like.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

The inventive concept has the following various effects.

First, unlike a conventional media simply limited by a time axis, it is possible to provide a user with a multi-reactive video, which is variously output depending on an event, by applying various playback conditions according to a user's manipulation to a multi-reactive video. In this way, as repeated attempts for identifying various results of users are induced, it is possible to increase a user's interest in an object (i.e., a thing) included in a multi-reactive video. In other words, as a specific condition is set for a video through a multi-reactive video generation file, it is possible to provide a user with a multi-reactive video to which various events are applied.

Second, various actions (i.e., reactions) may be applied as the multi-reactive video generation file is played with a general video or a combination of a plurality of image frames.

Third, various actions may be implemented based on a single captured image by applying image segmentation or cropping to a video frame.

Fourth, it is possible to grasp a user's reaction to a video by recording manipulation details for a specific user's multi-reactive video. For example, it is possible to grasp the object of interest and the degree of interest of a user and to grasp a user interest in the user, by grasping the number of touch manipulations to the user's multi-reactive video, a frame in which a touch manipulation has been performed, and an object in the frame, or the like.

Besides, it is possible to maximize the sense of reality and to generate rich experience content capable of being directly interacted with in a variety of manners by fully including various properties (e.g., the action of gravity and force, weight, a resistance value, a surface texture in both environmental and object aspects, elasticity, density, a size, a shape, a distance from an object, and sound) of real-world phenomena while each event is coupled to conditions of various input methods.

Moreover, according to an embodiment of the inventive concept, it is possible to grasp a user's intent and needs by accumulating and analyzing the user's interaction data for multi-reactive video content by using the generated multi-reactive video, and to perform hyper-personalization for grasping the user's characteristics based on data analysis results.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing reactive video-based service performed by a device, the method comprising:
    when at least one basic video is received from a first user terminal, generating a compressed video, which is implemented depending on a manipulation of a second user and which includes only a movement of an object, based on the at least one basic video, wherein the at least one basic video is an original video, which is reactively implemented depending on a manipulation of a user and which includes the movement of the object;
    generating a multi-reactive video generation condition by using a plurality of manipulation inputs corresponding to reactions capable of being generated in the compressed video;
    generating and uploading a multi-reactive video by applying the multi-reactive video generation condition to the compressed video; and
    when manipulation input information is received from the second user terminal as the second user enters a manipulation for the multi-reactive video, playing a video by applying the manipulation input information to the multi-reactive video,
    wherein the compressed video is data of a stack structure including information about a combination of images generated by dividing or correcting the at least one basic video,
    wherein the multi-reactive video generation condition includes data including information to be implemented reactively in combination with a specific region of the compressed video, and
    wherein the manipulation input information includes data including information about a user manipulation based on the multi-reactive video.

2. The method of claim 1, further comprising:
    after the uploading,
    when request information based on the multi-reactive video is input from the second user terminal,
    obtaining an element video based on the request information; and
    generating a plurality of response videos, which are obtained by transforming the obtained element video based on artificial intelligence.

3. The method of claim 1, further comprising:
    after the uploading,
    when response script information based on the multi-reactive video is received from the second user terminal,
    further combining the response script information to the multi-reactive video; and
    implementing a reaction depending on manipulation input information thus input later.

4. The method of claim 1, wherein the generating of the compressed video includes:
    deleting an image frame, which is not implemented reactively, from the at least one basic video by dividing a video section or recognizing a similarity between image frames.

5. The method of claim 1, wherein the generating of the compressed video includes:
    when a first basic video and a second basic video, which include the same object, include a movement for a path having the same object,
    storing a redundant section video included in one of the first basic video and the second basic video by extracting a section video including a movement of the same path from the first basic video and the second basic video.

6. The method of claim 1, wherein the plurality of manipulation inputs have at least one form of multi touch, multi actions, multi objects, multi scenes, multi outcomes, and multi reactions.

7. A reactive-video-based service providing device comprising:
    a communication module;
    a storage module configured to store at least one process required to provide a multi-reactive-video-based service; and a control module configured to control an operation for providing the multi-reactive-video-based service based on the at least one process, wherein the control module is configured to:

when at least one basic video is received from a first user terminal, generate a compressed video, which is implemented depending on a manipulation of a second user and which includes only a movement of an object, based on the at least one basic video, wherein the at least one basic video is an original video, which is reactively implemented depending on a manipulation of a user and which includes the movement of the object;

generate a multi-reactive video generation condition by using a plurality of manipulation inputs corresponding to reactions capable of being generated in the compressed video;

generate and upload a multi-reactive video by applying the multi-reactive video generation condition to the compressed video; and when manipulation input information is received from the second user terminal as the second user enters a manipulation for the multi-reactive video, play a video by applying the manipulation input information to the multi-reactive video, wherein the compressed video is data of a stack structure including information about a combination of images generated by dividing or correcting the at least one basic video, wherein the multi-reactive video generation condition includes data including information to be implemented reactively in combination with a specific region of the compressed video, and wherein the manipulation input information includes data including information about a user manipulation based on the multi-reactive video.

8. The reactive-video-based service providing device of claim 7, wherein, during the uploading, when request information based on the multi-reactive video is input from a second user terminal, the control module obtains an element video based on the request information and generates a plurality of response videos, which are obtained by transforming the obtained element video based on artificial intelligence.

9. The reactive-video-based service providing device of claim 7, wherein, during the uploading, when response script information based on the multi-reactive video is received from the second user terminal, the control module further combines the response script information to the multi-reactive video and implements a reaction depending on manipulation input information thus input later.

10. The reactive-video-based service providing device of claim 7, wherein, when generating the compressed video, the control module deletes an image frame, which is not implemented reactively, from the at least one basic video by dividing a video section or recognizing a similarity between image frames.

11. The reactive-video-based service providing device of claim 7, wherein, when generating the compressed video, the control module stores a redundant section video included in one of the first basic video and the second basic video by extracting a section video including a movement of the same path from the first basic video and the second basic video, when a first basic video and a second basic video, which include the same object, include a movement for a path having the same object.

12. The reactive-video-based service providing device of claim 7, wherein the plurality of manipulation inputs have at least one form of multi touch, multi actions, multi objects, multi scenes, multi outcomes, and multi reactions.

13. A non-transitory computer-readable recording medium storing a reactive video providing program, and configured to be coupled to a computer hardware, the program includes instructions to execute the method of claim 1.

* * * * *